United States Patent [19]

Yoshikawa et al.

[11] 3,952,136

[45] Apr. 20, 1976

[54] MULTI-LAYER PRODUCT OF METAL AND RESIN, AND ITS PRODUCTION

[75] Inventors: Kanji Yoshikawa; Yoshiharu Tatsukami, both of Niihama; Shuji Kitamura, Toyonaka; Junji Ono, Takatsuki; Haruo Tateiwa, Nagoya, all of Japan

[73] Assignee: Sumitomo Chemical Company, Limited, Japan

[22] Filed: Sept. 25, 1974

[21] Appl. No.: 509,039

Related U.S. Application Data

[63] Continuation-in-part of Ser. No. 212,771, Dec. 27, 1971, abandoned.

[30] Foreign Application Priority Data

Dec. 28, 1970  Japan............................ 46-129969

[52] U.S. Cl.................. 428/463; 428/416; 428/418; 428/461
[51] Int. Cl.²................. B32B 27/32; B32B 27/30; B32B 27/38
[58] Field of Search.............. 117/132 BE, 132 C; 161/216, 218, 186; 428/461, 463, 413, 416, 418

[56] References Cited
UNITED STATES PATENTS

| | | | |
|---|---|---|---|
| 2,829,984 | 4/1958 | Yaeger.......................... | 117/132 BE |
| 3,127,296 | 3/1964 | Guziak.......................... | 117/132 BE |
| 3,201,374 | 8/1965 | Simms........................... | 117/132 C |
| 3,249,570 | 5/1966 | Potts et al.................... | 117/132 C |
| 3,382,092 | 5/1968 | Ilnyckyj et al................. | 428/463 X |
| 3,383,372 | 5/1968 | Spivey.......................... | 161/218 X |
| 3,392,045 | 7/1968 | Holub........................... | 428/461 X |
| 3,393,174 | 7/1968 | Potter et al.................... | 260/41 |
| 3,440,199 | 4/1969 | Lindemann et al................. | 117/148 X |
| 3,640,833 | 2/1972 | Oberst et al.................... | 161/218 X |
| 3,749,637 | 7/1973 | Reardon et al................... | 428/461 X |
| 3,826,862 | 7/1974 | Ichiba et al.................... | 428/463 X |

*Primary Examiner*—Harold Ansher
*Attorney, Agent, or Firm*—Stewart and Kolasch, Ltd.

[57] ABSTRACT

A multi-layer product of metal and resin which comprises a layer of a metal and a layer of a resin adhered thereon, said resin being a copolymer consisting essentially of ethylene, at least one unsaturated glycidyl monomer and at least one unsaturated ethylenic monomer. In the resultant multi-layer product, the metal layer and the resin layer are firmly bonded to each other.

4 Claims, No Drawings

MULTI-LAYER PRODUCT OF METAL AND RESIN, AND ITS PRODUCTION

This is a continuation-in-part of Application Ser. No. 212,771, filed Dec. 27, 1971, now abandoned.

The present invention relates to a multi-layer product of metal and resin.

It is known that a multi-layer product of metal and polyolefin is useful as a construction material due to its high strength attributable to the metal and lightness and cheapness attributable to the polyolefin. Since, however, a polyolefin has generally no polar group, the adhesion of the metal and the polyolefin is insufficiently realized with a conventional adhesive, and a satisfactory multi-layer product is not obtained in this manner. For improvement of the adhesion of metal and polyolefin, a variety of methods have been proposed. For example, the use of a copolymer of ethylene and vinyl acetate which has a polar group as the adhesive has been suggested. But the adhesive strength of such copolymer is still unsatisfactory. Further, the introduction of acidic groups into polypropylene by grafting has been proposed [M. Imoto; Setchaku 9, 418 (1965)]. For execution of uniform grafting, however, the polyolefin must be uniformly dissolved in a large amount of a solvent and the addition of an organic peroxide is sometimes necessitated. Thus, the operations for the reaction and the treatment after reaction become complicated, and the deterioration of polypropylene may be caused due to the organic peroxide. In addition, a troublesome operation is required for removal of unreacted monomers. In case of not using a solvent, the uniform grafting reaction of polypropylene is not attained.

As the result of an extensive study, it has been found that an excellent adhesion of polyolefin and metal can be realized by the use of a specific ethylenic copolymer.

According to the invention, there is provided a multi-layer product of metal and resin which comprises a layer of a metal and a layer of a resin adhered thereon, said resin being a copolymer consisting essentially of ethylene, at least one unsaturated glycidyl monomer and at least one unsaturated ethylenic monomer.

Any suitable metal can be employed in the multi-layer product of the invention, and particularly preferred are iron, aluminum, zinc, tin, copper, etc. Their alloys may be also employed. On preparation of the multi-layer product of the invention, the surfaces of the metal is preferably previously cleaned so as to eliminate soils, stains, oils, fats and other organic residues for assuring the firm bonding between the metal and the resin. Further, the application of a per se conventional pre-treatment procedure such as treatment with a chromate or phosphate solution to the surface is desirable to realize a better adhesion.

As the resin, there is used a copolymer consisting essentially of ethylene, at least one unsaturated glycidyl monomer and at least one unsaturated ethylenic monomer (hereinafter referred to as "ethylene copolymer (A)").

The ethylene copolymer (A) consists essentially of (a) about 50 to 98% by weight, preferably 60 to 95% by weight, of ethylene unit, (b) about 1 to 25% by weight, preferably 2 to 20% by weight, of at least one unsaturated glycidyl monomer unit, and (c) about 1 to 25% by weight, preferably 3 to 20% by weight, of at least one unsaturated ethylenic monomer unit based on the weight of the copolymer. The ethylene copolymer (A) has an intrinsic viscosity of 0.5 to 1.5 deciliters per g, preferably 0.7 to 1.3 deciliters per g, at 135°C in tetralin solution and a melt index of 300 to 0.01 g per 10 minutes, preferably 200 to 0.3 g per 10 minutes, under a load of 2160 g at 190°C.

When the content of the unsaturated glycidyl monomer unit in the ethylene copolymer (A) is less than about 1% by weight, any appreciable adhesion is not realized. When it is more than about 25% by weight, the adhesion is saturated and the effect is economically decreased. Further, in the case that the content of the unsaturated ethylenic monomer unit in the ethylene copolymer (A) is less than about 1% by weight, any marked synergistic effect in adhesion is not recognized in comparison with an ethylene-unsaturated glycidyl monomer copolymer. In the case that it is more than about 25% by weight, the heat stability of the ethylene copolymer (A) is decreased.

The unsaturated glycidyl monomer may be a monomer containing an unsaturated bond copolymerizable with an unsaturated ethylenic monomer and at least one epoxy group. Specific examples are glycidyl acrylate, glycidyl methacrylate and monoglycidyl itaconate. Among them, glycidyl acrylate and glycidyl methacrylate are particularly preferred monomers.

As the unsaturated ethylenic monomer, there may be exemplified olefins such as propylene, butene-1, decene-1 and octadecene-1, vinyl esters of saturated carboxylic acids having 2 to 6 carbon atoms such as vinyl acetate and vinyl propionate, acrylates and methacrylates of saturated alcohols having 1 to 18 carbon atoms such as methyl acrylate, methyl methacrylate, ethyl acrylate, ethyl methacrylate, propyl acrylate, propyl methacrylate, butyl acrylate, butyl methacrylate, 2-ethylhexyl acrylate, 2-ethylhexyl methacrylate, cyclohexyl acrylate, cyclohexyl methacrylate, dodecyl acrylate, dodecyl methacrylate, octadecyl acrylate and octadecyl methacrylate, maleic anhydride, monoesters and diesters of maleic acid with saturated alcohols having 1 to 18 carbon atoms such as monomethyl maleate, monoethyl maleate, monobutyl maleate, monocyclohexyl maleate, mono-2-ethylhexyl maleate, monododecyl maleate, monooctadecyl maleate, dimethyl maleate, diethyl maleate, dibutyl maleate, dicyclohexyl maleate, di-2-ethyl-hexyl maleate, didodecyl maleate and dioctadecyl maleate, vinyl chloride, vinyl ethers such as vinyl methyl ether and vinyl ethyl ether, N-vinyllactams such as N-vinylpyrrolidone and N-vinylcaprolactam, acrylamides, sec.-vinylcarbonamides, N-vinyl-N-carbonamides, etc. Among them, acrylates and methacrylates of saturated alcohols (e.g. methyl acrylate, ethyl acrylate, 2-ethylhexyl acrylate, methyl methacrylate, ethyl methacrylate, 2-ethylhexyl methacrylate) and vinyl esters of saturated carboxylic acids (e.g. vinyl acetate, vinyl propionate) are particularly preferred unsaturated ethylenic monomers.

The ethylene copolymer (A) can be prepared by several methods. For instance, about 50 to 99.90% by weight of ethylene, about 0.05 to 25% by weight of at least one unsaturated glycidyl monomer and about 0.05 to 25% by weight of at least one unsaturated ethylenic monomer are copolymerized at about 40° to 300°C under a pressure of about 50 to 4,000 atmospheres in the presence of about 0.0001 to 1% by weight of a catalyst on the basis of the total amount of the said monomers.

The preparation of the multi-layer product of the invention may be carried out by per se conventional procedures such as piling, spraying, bonding, pressing, calendering and the like. In one of the preparation procedures, a sheet of the ethylene copolymer (A) is placed on a metal plate, and heating and/or pressing are applied thereto. In another preparation procedure, a sheet of polyolefin, a sheet of the ethylene copolymer (A) and a metal plate are piled in this order, and heating and/or pressing are applied thereto. In a further preparation procedure, a dispersion or solution of the ethylene copolymer (A) in water or an organic solvent such as aliphatic hydrocarbons (e.g. heptane, decane), aromatic hydrocarbons (e.g. toluene, xylene) and halogenated hydrocarbons (e.g. chlorobenzene), if necessary, by the aid of an emulsifier or a surfactant is applied on a metal plate to form a coating layer, a metal plate is placed thereon, and heating and/or pressing are applied thereto. There may be also adopted any other coating procedure such as electrostatic coating, flame blowing coating, vacuum spraying and flowing dipping.

When desired, any additive such as stabilizers, pigments and fillers may be incorporated into the ethylene copolymer (A).

Practical and presently preferred embodiments of the present invention are illustratively shown in the following Examples.

EXAMPLE 1

On the surface of an aluminum plate (70 × 25 × 0.3 mm), ethylene-glycidyl methacrylate-vinyl acetate copolymer (copolymerization ratio, 82 : 6 : 12 by weight; melt index, 3) is applied. An aluminum foil (35 × 25 × 0.02 mm) is placed thereon in such a manner that one end of the former is exactly lined up with a corresponding end of the latter. Then, an aluminum plate having the same size as above is placed thereon. The piled product is, after being heated at 200°C for 3 minutes, pressed to 20 kg/cm² in 2 minutes, allowed to stand under such pressure for 5 minutes and then cooled by the aid of a press for cooling to give a multi-layer product where the thickness of the resin layer is 1 mm. The peeling off strength at 180° with a charge of 100 kg/cm² and a rate of 100 mm/min. at 25°C is more than 50 kg/cm² which leads to breaking of the aluminum plate. When the test is carried out on a multi-layer product with ethylene-glycidyl methacrylate copolymer (copolymerization ratio, 94 : 6 by weight; melt index, 3) in the same manner as above, the peeling off strength is 18 kg/cm (control 1). Similarly, the peeling off strength on a multi-layer product with ethylene-vinyl acetate copolymer (copolymerization ratio, 88 : 12 by weight; melt index, 3) is 13 kg/cm (control 2).

From the above, it is understood that the ethylene-glycidyl methacrylate-vinyl acetate copolymer shows a remarkable synergistic effect.

EXAMPLE 2

As in Example 1, a multi-layer product consisting of ethylene-glycidyl methacrylate-vinyl acetate copolymer (copolymerization ratio, 80 : 12 : 8 by weight; melt index, 7) and aluminum plates is prepared. The peeling off strength of the multi-layer product at 180° is more than 50 mg/cm with the breaking of the aluminum plate. The peeling off strength on a multi-layer product with ethylene-glycidyl methacrylate copolymer (copolymerization ratio, 88 : 12 by weight; melt index, 3) is 13 kg/cm (control 2).

From the above, it is understood that, even in the case of the content of glycidyl methacrylate being equal, the incorporation of vinyl acetate in a small amount is effective for a marked increase of the peeling off strength.

EXAMPLES 3 to 5

As in Example 1, multi-layer products are produced with variations of the kinds of the ethylene-glycidyl methacrylate-vinyl acetate copolymer and of the metal plate. The peeling off strength of the multi-layer products is measured and shown in Table 1. For comparison, the peeling off strength of the multi-layer products with any other copolymer (controls 1 to 5) as well as that obtained in Examples 1 and 2 are also shown in Table 1.

Table 1

| Example No. | Metal | Ethylene copolymer (A) (ratio by weight) | Melt index | Peeling off strength (kg/cm) |
|---|---|---|---|---|
| 1 | Aluminum | E : GMA : VA (94 : 6 : 12) | 3 | Aluminum plate broken |
| 2 | Aluminum | E : GMA : VA (80 : 12 : 8) | 7 | Aluminum plate broken |
| 3 | Iron | E : GA : VA (90 : 3 : 7) | 3 | Iron plate broken |
| 4 | Aluminum | E : GMA : MA (70 : 20 : 10) | 30 | Aluminum plate broken |
| 5 | Aluminum | E : GMA : 2EHA (90 : 6 : 4) | 3 | Aluminum plate broken |
| Control 1 | Aluminum | E : GMA (94 : 6) | 3 | 18 |
| Control 2 | Aluminum | E : VA (88 : 12) | 3 | 13 |
| Control 3 | Iron | E : GA (97 : 3) | 3 | 12 |
| Control 4 | Aluminum | E : GMA (80 : 20) | 30 | 37 |
| Control 5 | Aluminum | E : GMA : VA (35 : 25 : 40) | >1000 | 8 |

Table 1-continued

| Example No. | Metal | Resin Ethylene copolymer (A) (ratio by weight) | Melt index | Peeling off strength (kg/cm) |
|---|---|---|---|---|
| | num | | | |

Note:
E, ethylene.
GA, glycidyl acrylate.
GMA, glycidyl methacrylate.
VA, vinyl acetate.
MA, methyl acrylate.
2EHA, 2-ethylhexyl acrylate.

EXAMPLE 6

Ethylene-glycidyl methacrylate-vinyl acetate copolymer (copolymerization ratio, 74 : 21 : 5 by weight; intrinsic viscosity, 1.06 dl/g) is dissolved at 130°C in a more volatile hydrocarbon mixture obtained by the fractional distillation of kerosene at a temperature of 150° to 280°C to make a 20% by weight solution. An iron plate (130 × 130 × 0.6 mm) treated with a chromate solution is dipped in the above obtained solution and dried in the atmosphere for 5 minutes. The dried plate is baked at 200°C for 5 minutes and cooled abruptly in water to form a resin film of 0.004 mm in thickness on the surface of the plate. The thus obtained film is notched in squares of 10 × 40 mm by the aid of a razor. A pressure sensitive cellophane tape is adhered thereon under pressure and then peeled off abruptly whereby no square is peeled off from the plate.

In the same manner as above, a film of 0.005 mm in thickness is formed on an iron plate using polyethylene (melt index, 0.5; density, 0.955). When the film is subjected to the same peeling off test as above, about two-thirds of the squares are completely peeled off from the iron plate.

EXAMPLE 7

A film of 0.1 mm in thickness produced from ethylene-glycidyl methacrylate-vinyl acetate copolymer (copolymerization ratio, 87 : 12 : 1 by weight; intrinsic viscosity, 1.00 dl/g) is put between an aluminum plate of 1 mm in thickness and a polypropylene film (melt index, 8; isotactic index, 96%) of 0.1 mm in thickness. The materials in layers are pressed at 210°C under a pressure of 20 kg/cm² for 10 minutes by the aid of a hot press to give a multi-layer product. When it is subjected to the same peeling off test as in Example 6, no square is peeled off. On the contrary, in the case of a multi-layer product obtained using a polypropylene film, about one-fifth of the squares is peeled off.

EXAMPLE 8

As in Example 1, a multi-layer product consisting of ethylene-glycidyl methacrylate-vinyl acetate copolymer (copolymerization ratio, 82 : 6 : 12 by weight; melt index, 3) and aluminum plates is prepared. The thickness of the resin layer is 100 μ. Similarly, a multi-layer product consisting of ethylene-glycidyl acrylate-vinyl acetate copolymer prepared as described in Example 1 of U.S. Pat. No. 3,440,199 (content of ethylene units, 28%; intrinsic viscosity, 0.50) and aluminum plates is prepared. The thickness of the resin layer is 100 μ. These products are immersed in water at 60°C, and the peeling strength is determined according to ASTM D903-49 with a peeling speed of 250 mm/min. In case of using the ethylene-glycidyl methacrylate-vinyl acetate copolymer, any peeling is not observed even after immersion for 180 days, and the peeling strength on the 180th day is higher than 25 kg/25 mm. In case of using the ethylene-glycidyl acrylate-vinyl acetate copolymer, complete peeling is observed already after 7 days, and the peeling strength is 0 kg/25 mm.

From the above, it is understood that the ethylene-glycidyl methacrylate-vinyl acetate copolymer is excellent in its resistance to water.

What is claimed is:

1. A multi-layer product of metal and resin which comprises a layer of a metal selected from the group consisting of iron, aluminum, zinc, tin, copper and alloys thereof and a layer of a resin adhered thereto, said resin being a copolymer consisting essentially of (a) about 50 to 98% by weight of ethylene unit, (b) about 1 to 25% by weight of at least one unsaturated glycidyl ester monomer unit, and (c) about 1 to 25% by weight of at least one unsaturated ethylenic monomer unit other than ethylene, based on the weight of the copolymer.

2. The multi-layer product of metal and resin according to claim 1, wherein the resin is a copolymer having an intrinsic viscosity of 0.5 to 1.5 deciliters per gram at 135°C in a tetralin solution and a melt index of 300 to 0.01 g per 10 minutes under a load of 2160 g at 190°C.

3. The multi-layer product of metal and resin according to claim 1, wherein the unsaturated glycidyl monomer is selected from the group consisting of glycidyl acrylate, glycidyl methacrylate and monoglycidyl itaconate.

4. The multi-layer product of metal and resin according to claim 1, wherein the unsaturated ethylenic monomer is selected from the group consisting of vinyl acetate, vinyl propionate, methyl acrylate, ethyl acrylate, 2-ethylhexyl acrylate, methyl methacrylate, ethyl methacrylate and 2-ethylhexyl methacrylate.

* * * * *